(12) United States Patent
Tsai et al.

(10) Patent No.: US 12,117,339 B1
(45) Date of Patent: Oct. 15, 2024

(54) SINGLE PHOTON AVALANCHE DIODE BASED OPTICAL SENSOR, EVENT-BASED VISION SENSOR AND OPERATING METHOD THEREOF

(71) Applicant: PIXART IMAGING INC., Hsin-Chu County (TW)

(72) Inventors: Tso-Sheng Tsai, Hsin-Chu County (TW); Kuei-Yang Tseng, Hsin-Chu County (TW); Yueh-Lin Chung, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 18/464,304

(22) Filed: Sep. 11, 2023

(51) Int. Cl.
*G01J 1/44* (2006.01)
(52) U.S. Cl.
CPC ......... *G01J 1/44* (2013.01); *G01J 2001/4466* (2013.01)
(58) Field of Classification Search
CPC .............................. G01J 1/44; G01J 2001/4466
See application file for complete search history.

(56) References Cited

U.S. PATENT DOCUMENTS 10,992,384 B1 * 4/2021 Couper ................. H04B 10/66
2021/0185260 A1 6/2021 Huang et al.

* cited by examiner

*Primary Examiner* — Georgia Y Epps
*Assistant Examiner* — Don J Williams
(74) *Attorney, Agent, or Firm* — HAUPTMAN HAM, LLP

(57) ABSTRACT

There is provided an optical sensor including an SPAD pixel array, multiple counters and a processor. The multiple counters count photon events of the SPAD pixel array to output an event-based vision sensor (EVS) frame per EVS period. The processor determines an index state of each pixel of the SPAD pixel array by comparing a counting value of each pixel respectively at a predetermined number of checking points with two predetermined thresholds, and calculates an index change of the index state associated with each pixel between adjacent EVS frames. The processor further changes the EVS period and/or adds a count offset to the counting value of each pixel to improve sensitivity of the event-based vision sensor.

20 Claims, 7 Drawing Sheets

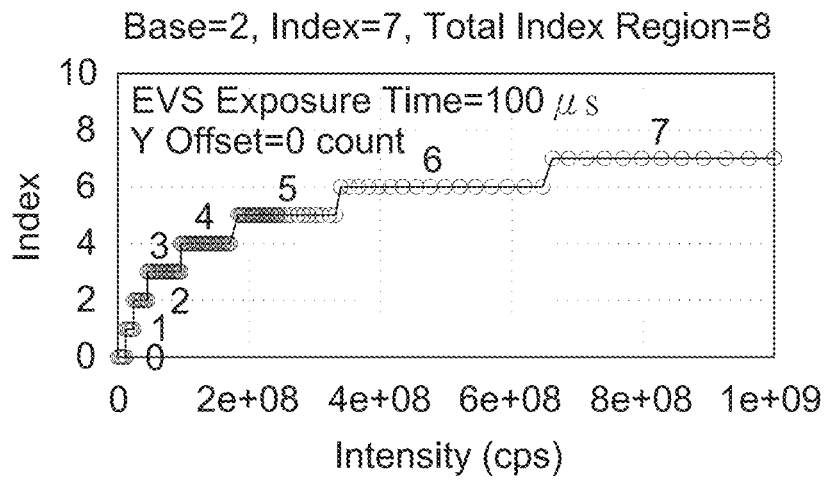

FIG. 10 counting, by a counter, a number of photons received by one SPAD pixel respectively within adjacent exposure times, including a first exposure time and a second exposure time
⎱ 1101 determining, by a processor, a first index state of said one SPAD pixel according to a first photon counts counted by the counter within the first exposure time
⎱ 1102 determining, by the processor, a second index state of said one SPAD pixel according to a second photon counts counted by the counter within the second exposure time
⎱ 1103 calculating, by the processor, an index change between the first index state and the second index state to indicate an illumination change detected by said one SPAD pixel
⎱ 1104

FIG. 11

SINGLE PHOTON AVALANCHE DIODE BASED OPTICAL SENSOR, EVENT-BASED VISION SENSOR AND OPERATING METHOD THEREOF

FIELD OF THE DISCLOSURE

This disclosure generally relates to an optical sensor and, more particularly, to a single photon avalanche diode (SPAD) based optical sensor that is used as an event-based vision sensor with pixel-wise detection ability in a digital phase and an operating method thereof.

BACKGROUND OF THE DISCLOSURE

An event-based vision sensor (EVS) can realize high-speed data output with low latency by limiting the output data to luminance changes from each pixel. The EVS sensor is mainly focused on ambient light changes that can be applied to various applications such as autonomous driving, human tracking and robot vision. The current EVS sensors mainly adopt pinned photon diode (PPD) in pixels to receive light for being post-processing to identify the luminance changes.

In the current trend, it is expected to embed EVS pixels in a CMOS image sensor (CIS). However, the EVS pixels adopting pinned photon diode requires a large area for arranging post-processing circuit. Meanwhile, the EVS pixels and CIS pixels require different post-processing circuits that are not compatible to each other, and thus it is quite difficult to embed the EVS pixels in each and every pixel of the CMOS image sensor. In current CMOS image sensors embedded with EVS pixels, the EVS pixels only arranged in a part of pixels of the CMOS image sensors.

Accordingly, it is required to provide an event-based vision sensor that is embedded with an EVS pixel in each and every pixel of a CMOS image sensor.

SUMMARY

The present disclosure provides an optical sensor that adopts SPAD pixels to implement an event-based vision sensor with pixel level detection ability according to digital photon counts of every pixel without adopting pinned photon diodes.

The present disclosure further provides an optical sensor that can be expanded to realize an SPAD-based event-based vision sensor with a high dynamic range.

The present disclosure provides an event-based vision including a pixel array, a plurality of counters and a processor. The pixel array includes a plurality of single photon avalanche diode (SPAD) pixels arranged in a matrix. The plurality of counters are coupled to the pixel array, and configured to count a number of photons received by the plurality of SPAD pixels. The processor is coupled to the plurality of counters, and configured to determine an index state of each SPAD pixel corresponding to each sub-frame according to the number of photons received by the plurality of SPAD pixels within a sub-frame period, and calculate an index change of said each SPAD pixel between two adjacent sub-frames.

The present disclosure further provides an operating method of determining an illumination change detected by one SPAD pixel of an event-based vision sensor. The operating method includes the steps of: counting, by a corresponding counter, a number of photons received by said one SPAD pixel respectively within adjacent exposure times, including a first exposure time and a second exposure time; determining, by a processor, a first index state of said one SPAD pixel according to a first photon counts counted by the corresponding counter within the first exposure time; determining, by the processor, a second index state of said one SPAD pixel according to a second photon counts counted by the corresponding counter within the second exposure time; and calculating, by the processor, an index change between the first index state and the second index state to indicate the illumination change detected by one SPAD pixel.

The present disclosure further provides an optical sensor including a pixel array, a plurality of counters and a processor. The pixel array includes a plurality of single photon avalanche diode (SPAD) pixels arranged in a matrix. The plurality of counters are coupled to the pixel array, and configured to count a number of photons received by the plurality of SPAD pixels. The processor is coupled to the plurality of counters, and configured to calculate an index change of every SPAD pixel to indicate an illumination change detected by said every SPAD pixel within a sub-frame period, and generate an image frame according to the number of photons of the plurality of SPAD pixels counted within a frame period, larger than the sub-frame period.

BRIEF DESCRIPTION OF DRAWINGS

Other objects, advantages, and novel features of the present disclosure will become more apparent from the following detailed description when taken in conjunction with the accompanying drawings.

FIG. 10 is a schematic diagram of altering the relationship between index states and light intensity in FIG. 5 by changing a number of temporal checkpoints within an exposure time of a sub-frame.

FIG. 11 is a flow chart of determining an illumination change detected by one SPAD pixel of an optical sensor according to one embodiment of the present disclosure.

DETAILED DESCRIPTION OF THE DISCLOSURE

It should be noted that, wherever possible, the same reference numbers will be used throughout the drawings to refer to the same or like parts.

Figure 1:
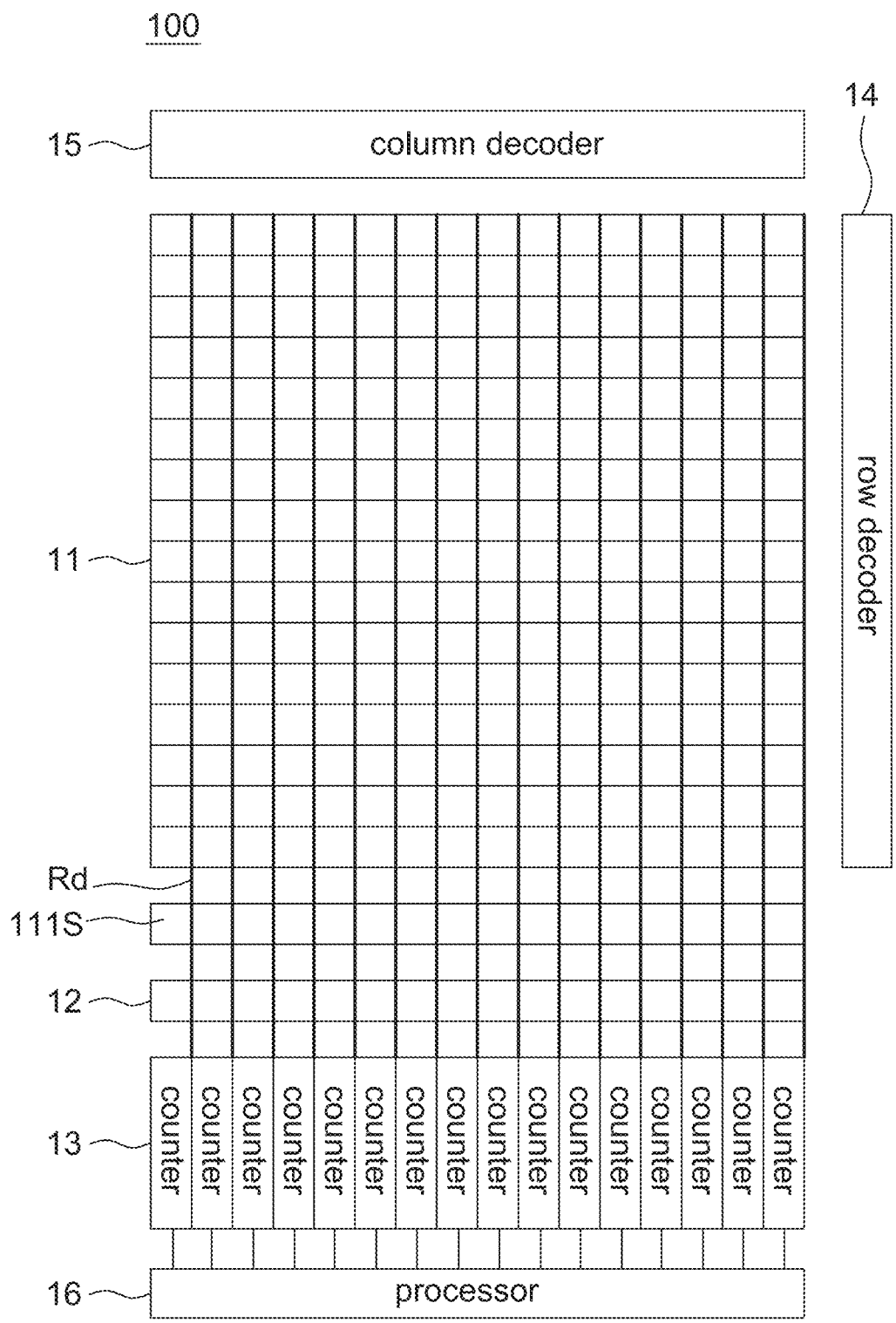
FIG. 1 is a schematic diagram of a single photon avalanche diode based optical sensor according to one embodiment of the present disclosure.

Referring to FIG. 1, it is a schematic diagram of an optical sensor 100 according to one embodiment of the present disclosure. The optical sensor 100 is used to detect illumination changes and thus used as an event-based vision sensor (EVS). The optical sensor 100 is also used to output an image frame containing photon numbers (or photon events) of every pixel as a single photon avalanche diode (SPAD) image sensor.

The optical sensor 100 includes a pixel array 11, a plurality of output circuits 111S, a plurality of pulling circuits 12, a plurality of counters 13, a row decoder 14, a column decoder 15 and a processor 16. The pixel array 11 includes a plurality of SPAD pixels (i.e. each pixel including at least one SPAD) arranged in a matrix, e.g., 16×16 pixels being shown in FIG. 1, but not limited to 16×16 pixels. The plurality of counters 13 are coupled to the pixel array 11, and used to count a number of photons received by the plurality of SPAD pixels, e.g., one counter 13 sequentially counting a number of photons received by a column of SPAD pixels.

The processor 16 is an application specific integrated circuit (ASIC), a microprocessor unit (MCU) or a field programmable gate array (FPGA) according to different applications, and implements operations thereof (described below) using hardware and/or firmware. The processor 16 is coupled to the counters 13, and generates an image frame according to the number of photons of the plurality of SPAD pixels counted within a frame period. The image frame is used to perform the object tracking, gesture recognition, 3D image construction, and biological feature detection and recognition, but not limited thereto.

Figure 2:
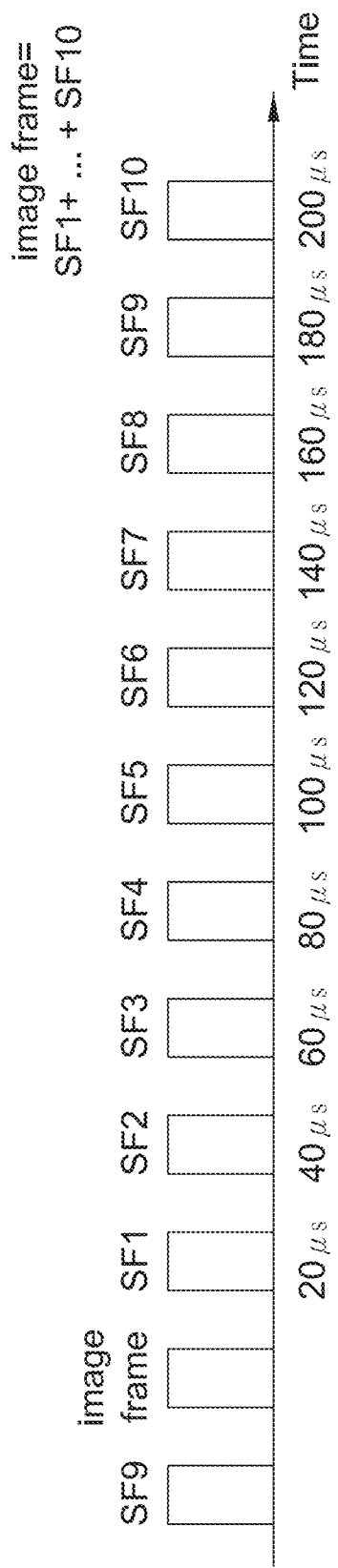
FIG. 2 is a schematic diagram of acquiring image frames and sub-frames by the single photon avalanche diode based optical sensor in FIG. 1.

In the present disclosure, before the image frame is generated (e.g., per 200 μs), the processor 16 further calculates illumination changes according to sub-frames (shown as SF1 to SF10 generated per sub-frame period, e.g., 20 μs) generated prior to the image frame, e.g., referring to FIG. 2. Generally, the sub-frames (or called EVS frames herein) are generated faster than the image frame because generally a frame period is set to be larger than the sub-frame period so as to obtain necessary information (based on requirement) before the image frame is generated. The processor 16 than calculates an index change of every SPAD pixel between adjacent sub-frames to indicate an illumination change detected by said every SPAD pixel.

Figure 3:
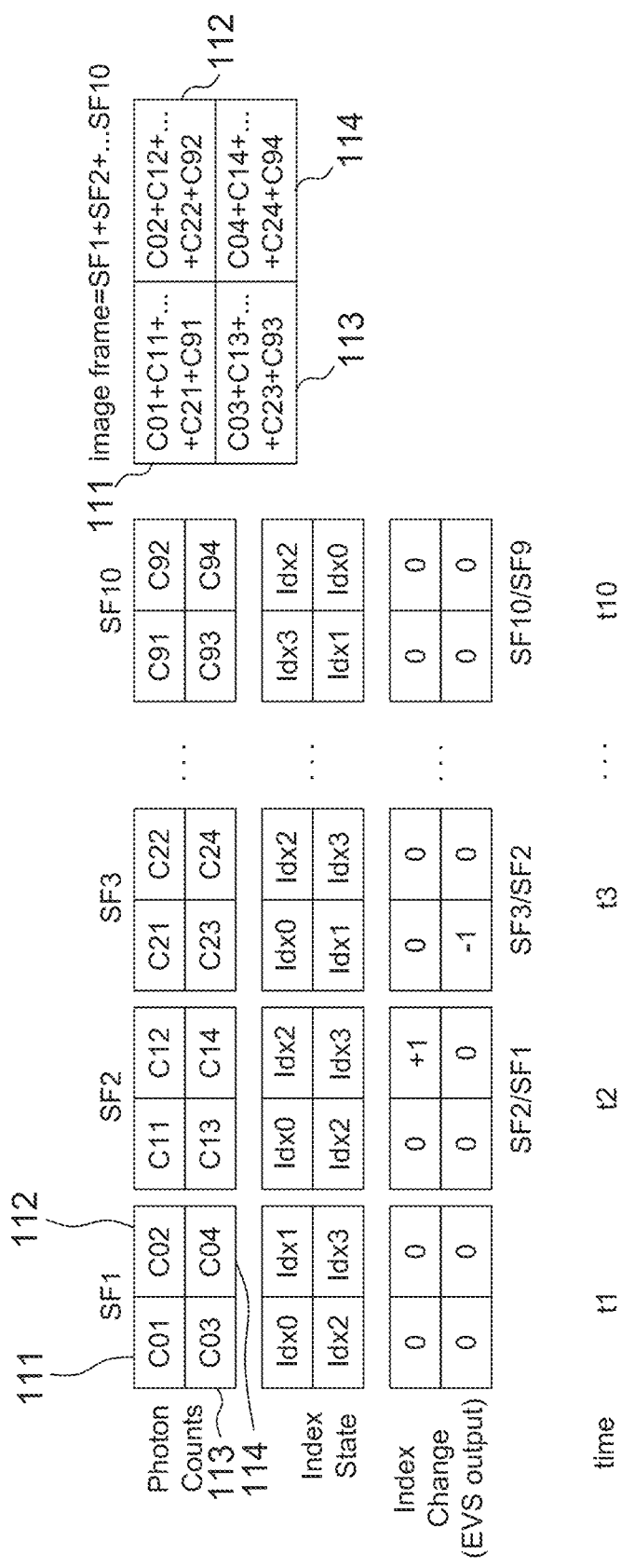
FIG. 3 is an operational schematic diagram of the single photon avalanche diode based optical sensor in FIG. 1.

Please refer to FIG. 3, each EVS frame (e.g., shown as SF1 to SF10 acquired at times t1 to t10) contains counting values (e.g., shown as C01 to C04 in SF1, C11 to C14 in SF2, . . . , C91 to C94 in SF10) of SPAD pixels (e.g., shown as 111, 112, 113 and 114) in the pixel array 11 (only four being shown for abbreviation purposes) acquired per 20 μs. The processor 16 generates an image frame every predetermined number of EVS frames, e.g., 10 EVS frames in FIG. 3. And pixel data (i.e. photon counts) of each pixel of the image frame is a summation of the number of photons received by a corresponding SPAD pixel within a plurality of sub-frame periods. For example, FIG. 3 shows that a photon count of pixel 111 of the image frame is obtained by calculating C01+C11+...+C91 of 10 EVS frames (e.g., SF1 to SF10), a photon count of pixel 112 of the image frame is obtained by calculating C02+C12+ . . . +C92 of 10 EVS frames, a photon count of pixel 113 of the image frame is obtained by calculating C03+C13+ . . . +C93 of 10 EVS frames, and a photon count of pixel 114 of the image frame is obtained by calculating C04+C14+ . . . +C94 of 10 EVS frames. The processor 16 performs predetermined operations according to the image frame.

It is appreciated that a number of EVS fames generated before one image frame is not limited to that shown in FIGS. 2 and 3.

The row decoder 14 and the column decoder 15 are used to determine a pixel position in the pixel array 11 that is being exposed and outputting a detected signal (e.g., pulses induced by photons). The operations of the row decoder 14 and the column decoder 15 are known to the art and are not main objectives of the present disclosure, and thus details thereof are not described herein.

Each of the output circuits 111S is coupled to one pixel circuit column via a readout line Rd and coupled to one pulling circuit 12 and one counter 13 via the readout line Rd. Each of the pulling circuits 12 is used to pull up/down an output voltage of an SPAD pixel after a pulse in the output voltage being read out.

Operations of the output circuits 111S and the pulling circuits 12 may be referred to U.S. application Ser. No. 17/172,147, entitled "IMAGE SENSOR EMPLOYING AVALANCHE DIODE AND SHARED OUTPUT CIRCUIT" filed on Feb. 10, 2021, assigned to the same assignee of the present application, and the full disclosure of which is incorporated herein by reference. In some examples, the output circuits 111S are respectively embedded in each pixel circuit, and details thereof may also be referred to U.S. application Ser. No. 17/172,147.

The operation of an event-based vision sensor (implemented by optical sensor 100) of the present disclosure is described hereinafter. The event-based vision sensor is used to determine an illumination change of every SPAD pixel of the pixel array 11.

Please refer to FIGS. 2 and 3 again, as mentioned above the processor 16 receives a sub-frame per sub-frame period, e.g., 20 μs. The processor 16 then determines an index state of each SPAD pixel (e.g., shown as 111 to 114 in FIG. 3) corresponding to each sub-frame (e.g., shown as SF1 to SF10 in FIG. 3) according to the number of photons received by the plurality of SPAD pixels within an exposure time of a sub-frame period thereof.

Figure 4:
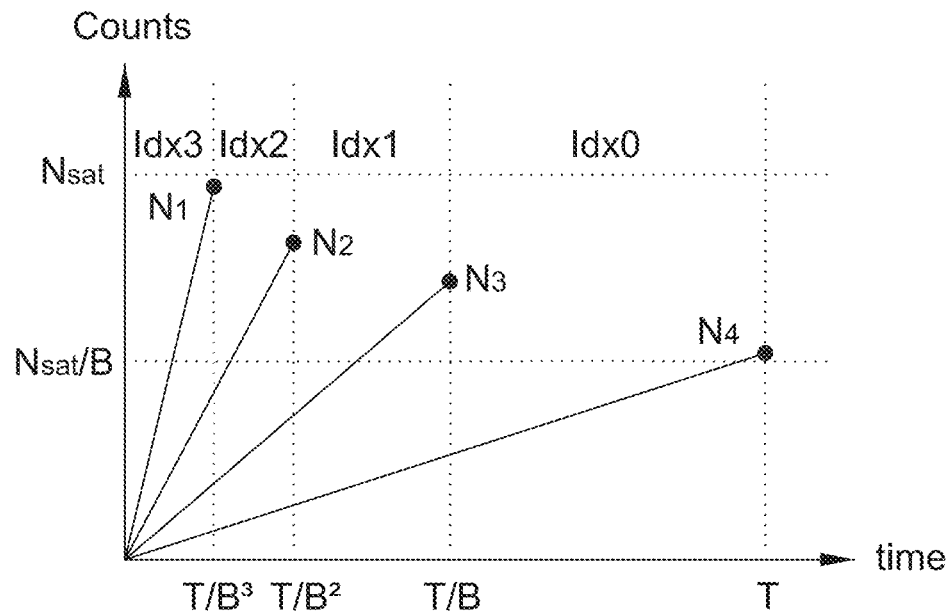
FIG. 4 is a schematic diagram of counting values of a pixel at different temporal checkpoints within an exposure time of a sub-frame in determining an index state of the pixel.

Referring to FIG. 4, in determining an index state of one SPAD pixel in a sub-frame, the processor 16 compares a number of photons associated with said one SPAD pixel respectively read at a predetermined number of temporal checkpoints (e.g., shown as three checkpoints $T/B^3$, $T/B^2$ and $T/B$) within an exposure time T of a sub-frame period with two thresholds, e.g., shown as Nsat and Nsat/B.

In the present disclosure, the predetermined number of temporal checkpoints (sometimes abbreviated as checkpoints herein) has an exponential relationship to one another. More specifically, a third checkpoint $T/B$ is at a time point obtained by dividing an exposure time T of a sub-frame by a predetermined exponent B, wherein B is preferably a positive integer such as 2 shown in FIG. 4; a second checkpoint $T/B^2$ is at a time point obtained by dividing the third checkpoint $T/B$ by the predetermined exponent B, and a first checkpoint $T/B^3$ is at a time point obtained by dividing the second checkpoint $T/B^2$ by the predetermined exponent B. That is, the first checkpoint $T/B^3$ is prior to the second checkpoint $T/B^2$, and the second checkpoint $T/B^2$ is prior to the third checkpoint $T/B$.

In one example, one of the two thresholds (e.g., Nsat) is a saturation count of the counters 13, e.g., saturation count of a 10-bit counter being 1024. The other one of the two thresholds (e.g., Nsat/B) is the saturation count divided by the exponent (e.g., B herein) used to determine the first, second and third checkpoints.

The processor 16 then determines an index state of one SPAD according to a temporal checkpoint at which the number of photons (or called photon counts) associated with said one SPAD is between two thresholds Nsat and Nsat/B.

For example, the processor 16 compares a first number of photons (e.g., shown as N1) at the first checkpoint $T/B^3$ with the two thresholds Nsat and Nsat/B to determine whether said one SPAD pixel is in a third index region Idx3, i.e. index state=Idx3. If the first number of photons N1 is between Nsat and Nsat/B (e.g., smaller than or equal to Nsat as well as larger than or equal to Nsat/B), the processor 16 generates a flag signal (e.g., digital 1, but not limited to) to indicate that said one SPAD pixel is in the third index region Idx3, e.g., pixel 114 in FIG. 3 shown to be Idx3 in sub-frame SF1.

If the first number of photons N1 is not between Nsat and Nsat/B, the processor 16 generates a flag signal (e.g., digital 0, but not limited to), and then compares a second number of photons (e.g., shown as N2) at the second checkpoint $T/B^2$, behind the first checkpoint $T/B^3$, with the two thresholds Nsat and Nsat/B to determine whether said one SPAD pixel is in a second index region Idx2, i.e. index state=Idx2, upon said one SPAD pixel not in the third index region Idx3. If the second number of photons N2 is between Nsat and Nsat/B, the processor 16 generates a flag signal (e.g., digital 1, but not limited to) to indicate said one SPAD pixel is in the second index region Idx2, e.g., pixel 113 in FIG. 3 shown to be Idx2 in sub-frame SF1.

If the second number of photons N2 is not between Nsat and Nsat/B, the processor 16 generates a flag signal (e.g., digital 0, but not limited to), and compares a third number of photons (e.g., shown as N3) at the third checkpoint T/B, behind the second checkpoint $T/B^2$, with the two thresholds Nsat and Nsat/B to determine whether said one SPAD pixel is in a first index region Idx1, i.e. index state=Idx1, upon said one SPAD pixel not in the second index region Idx2. If the third number of photons N3 is between Nsat and Nsat/B, the processor 16 generates a flag signal (e.g., digital 1, but not limited to) to indicate said one SPAD pixel is in the first index region Idx1, e.g., pixel 112 in FIG. 3 shown to be Idx1 in sub-frame SF1.

If the third number of photons N3 is not between Nsat and Nsat/B, the processor 16 generates a flag signal (e.g., digital 0, but not limited to), and determines that said one SPAD pixel is in a zero index region, i.e. index state=Idx0, upon said one SPAD pixel not in the first index region Idx1, e.g., pixel 111 in FIG. 3 shown to be Idx0 in sub-frame SF1. In the present disclosure, the optical sensor 100 further includes registers for recording the flags corresponding to each SPAD pixel for being accessed by the processor 16 in determining an index change associated with each SPAD pixel.

It should be mentioned that the photon numbers N1, N2, N3 and N4 mentioned herein are only randomly selected for illustration purposes, and any one of N1, N2, N3 and N4 does not affect values of the others.

After index states of every SPAD pixel of the sub-frame SF1 are obtained, the processor 16 uses the same process to obtain index states of every SPAD pixel of every sub-frame SF2 to SF10, sequentially. For example, the SPAD pixel 111 of the sub-frame SF2 is shown to have the index state Idx0, the SPAD pixel 112 of the sub-frame SF2 is shown to have the index state Idx2, the SPAD pixel 113 of the sub-frame SF2 is shown to have the index state Idx2, and the SPAD pixel 114 of the sub-frame SF2 is shown to have the index state Idx3, e.g., corresponding flags also recorded in corresponding registers. For example, the SPAD pixel 111 of the sub-frame SF3 is shown to have the index state Idx0, the SPAD pixel 112 of the sub-frame SF3 is shown to have the index state Idx2, the SPAD pixel 113 of the sub-frame SF3 is shown to have the index state Idx1, and the SPAD pixel 114 of the sub-frame SF3 is shown to have the index state Idx3. The processor 16 is then able to calculate the index change according to the index states between adjacent sub-frames.

Figure 5:
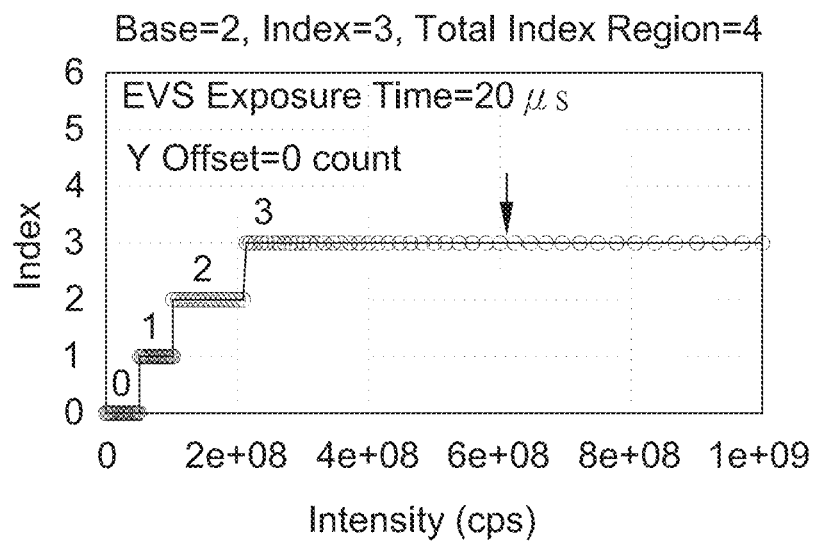
FIG. 5 is a schematic diagram of a relationship between index states and light intensity in determining an index change of every pixel.

Further referring to FIG. 4, the number of photons N1, N2 and N3 may be converted to a number of photons at the exposure time T in the case that the counters 13 have a counting limitation, i.e. Nsat. It is seen from FIG. 4 that if a counter 16 counts the number of photons N1, N2 and N3 respectively at checkpoints $T/B^3$, $T/B^2$ and T/B, the counter 16 is saturated before reaching the exposure time T. Therefore, by using an equation (1)

$$\text{Count}_{at\ T} = N_{(1,2,3,4)} \times (\text{Base})^{Index(3,2,1,0)} \quad (1),$$

a dynamic range of the counter 13 is improved to exceed the saturation count Nsat, i.e. high dynamic range SPAD sensor. It is seen from FIG. 4, in which Base=2, that a photon count of an SPAD pixel at the exposure time T within the zero index region Idx0 is between 0 and Nsat×$2^0$; a photon count of an SPAD pixel converted to the exposure time T within the first index region Idx1 is between Nsat×$2^0$ and Nsat×$2^1$; a photon count of an SPAD pixel converted to the exposure time T within the second index region Idx2 is between Nsat×$2^1$ and Nsat×$2^2$; and a photon count of an SPAD pixel converted to the exposure time T within the third index region Idx3 is between Nsat×$2^2$ and Nsat×$2^3$. By taking the Index (i.e. Idx0, Idx1, Idx2 and Idx3 herein) as a longitudinal axis and the light intensity (cps) as a transverse axis, a relationship between the Idx0, Idx1, Idx2 and Idx3 (respectively shown as 0, 1, 2, 3 for abbreviation in FIG. 5) and light intensity (higher photon counts corresponding to higher light intensity) is shown in FIG. 5. It is seen from FIG. 5 that the index state of an SPAD pixel is determined to be within different index regions corresponding to different light intensity (cps).

The processor 16 further calculates an index change of each SPAD pixel between two adjacent sub-frames. In the present disclosure, an index change is indicated by 1 or −1, and no index change is indicated by 0, but the present disclosure is not limited to.

For example, the processor 16 indicates the index change of one SPAD pixel by 1 when the index state of said one SPAD pixel increases to be larger than or equal to a changing step, e.g., the index state of the pixel 112 in the sub-frame SF2 being larger than the index state of the pixel 112 in the sub-frame SF1 by one index. That is, the changing step in this embodiment is one index step. Therefore, the EVS output is shown as (0, +1, 0, 0) by comparing index states between SF2 and SF1, e.g., shown as SF2/SF1 in FIG. 3.

For example, the processor 16 indicates the index change of one SPAD pixel by −1 when the index state of said one SPAD pixel decreases to be smaller than or equal to the changing step, e.g., the index state of the pixel 113 in the sub-frame SF3 being smaller than the index state of the pixel 113 in the sub-frame SF2 by one index. Therefore, the EVS output is shown as (0, 0, −1, 0) by comparing index states between SF3 and SF2, e.g., shown as SF3/SF2 in FIG. 3.

Furthermore, the processor 16 indicates no index change of one SPAD pixel by 0 when the index state of said one SPAD pixel does not increase to be larger than or equal to the changing step and does not decrease to be smaller than or equal the changing step, i.e. at the same index state. Those shown as 0 in the EVC output indicate no index change. It is appreciated that the EVS output corresponding to the sub-frame SF1 is preset as (0, 0, 0, 0) because there is no sub-frame before the sub-frame SF1.

In the present disclosure, the processor 16 further adjusts the exposure time (e.g., T shown in FIG. 4) when a number of SPAD pixels having the index change is not within a predetermined percentage range (e.g., 10% to 20%, but not limited to) of a total number of the plurality of SPAD pixels of the pixel array 11. For example in some scenarios, the light intensity is too strong such that an index state of one SPAD pixel of interest is always within the third index region Idx3 in successive sub-frames. The processor 16 shortens an exposure time T of said one SPAD pixel when index states of said one SPAD pixel is continuously in the third index region Idx3 for a predetermined number of sub-frames to improve a resolution of the index change.

Figure 6:
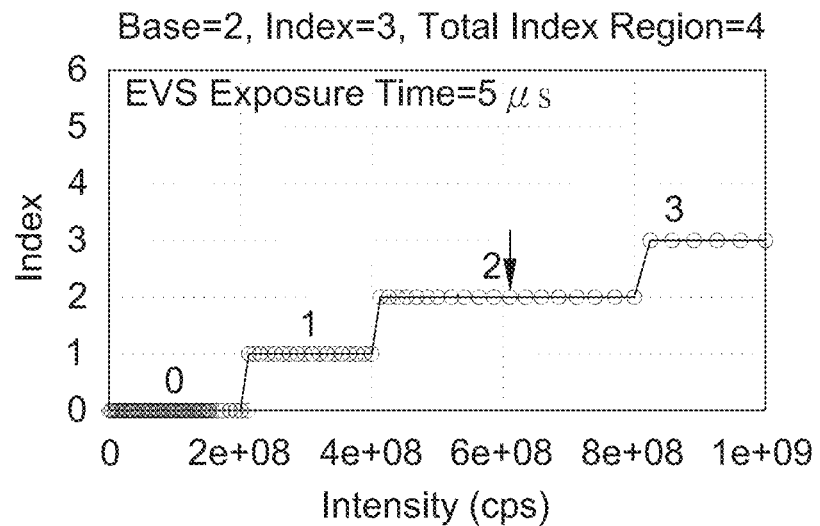
FIG. 6 is a schematic diagram of altering the relationship between index states and light intensity in FIG. 5 by changing the exposure time T in FIG. 4 to be able to detect an index change under strong light.
Figure 8:
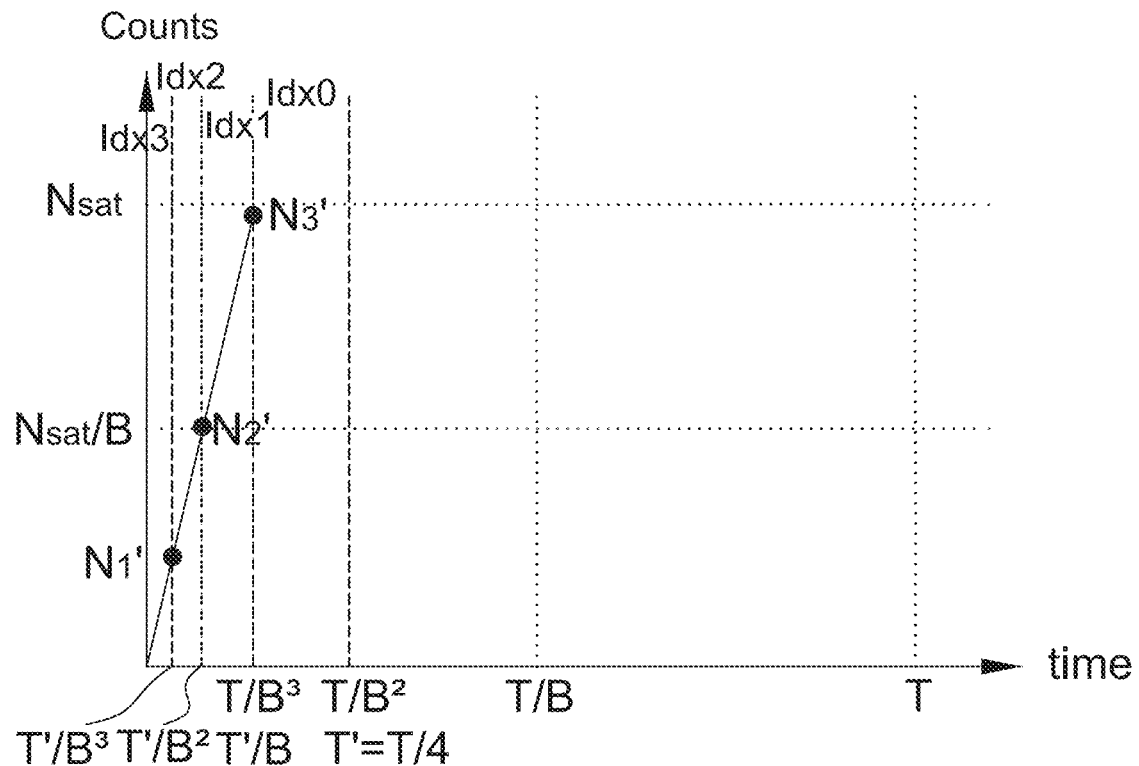
FIG. 8 is a schematic diagram of shortening an exposure time of a sub-frame in operating the optical sensor according to one embodiment of the present disclosure.

For example, FIG. 8 shows that the exposure time T is shortened to T'=T/4, and thus the checkpoints are changed to T' (corresponding to $T/B^2$ when B=2), T'/B (corresponding to $T/B^3$ when B=2), $T'/B^2$ and $T'/B^3$. It is assumed that the photon counts N3' at the checkpoint T'/B in FIG. 8 is corresponding to N1 at the checkpoint $T/B^3$ in FIG. 4, and the accumulation of photon counts is linear. It is seen from FIGS. 4 and 8 that the third index region Idx3 determined by a photon count N1 in FIG. 4 is changed to the second index region Idx2 determined by a photon count N2' (comparing with two thresholds Nsat and Nsat/B) in in FIG. 8. The relationship between index states and light intensity (cps) is shown in FIG. 6 after the exposure time T is shortened from 20 μs to 5 μs, i.e. T/4. It is also seen from FIGS. 5 and 6 that an SPAD pixel receiving light intensity (e.g., shown by an arrow symbol) in the third index region Idx3 in FIG. 5 is changed to be within the second index region Idx2 in FIG. 6 by shorting the exposure time. In this way, it is able to detect the index change under strong light intensity.

It is appreciated that the exposure time may be extended under weak light intensity.

In the present disclosure, the processor 16 further incorporates a count offset to the number of photons when a number of SPAD pixels having the index change is not within a predetermined percentage range (e.g., 10% to 20%, but not limited to) of a total number of the plurality of SPAD pixels. For example in the scenario that the light intensity is too strong such that an index state of one SPAD pixel of interest is always within the third index region Idx3 in successive sub-frames, the processor 16 adds a count offset (negative herein) to the number of photons received by said one SPAD pixel when index states of the SPAD pixel is continuously in the third index region for a predetermined number of sub-frames to improve a resolution of the index change.

Figure 7:
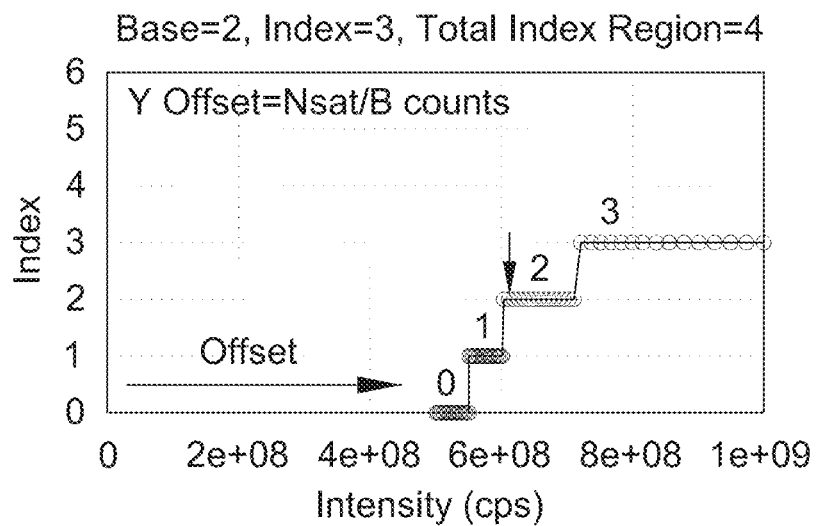
FIG. 7 is a schematic diagram of altering the relationship between index states and light intensity in FIG. 5 by incorporating a count offset to a counting value of each pixel to be able to detect an index change under strong light.
Figure 9:
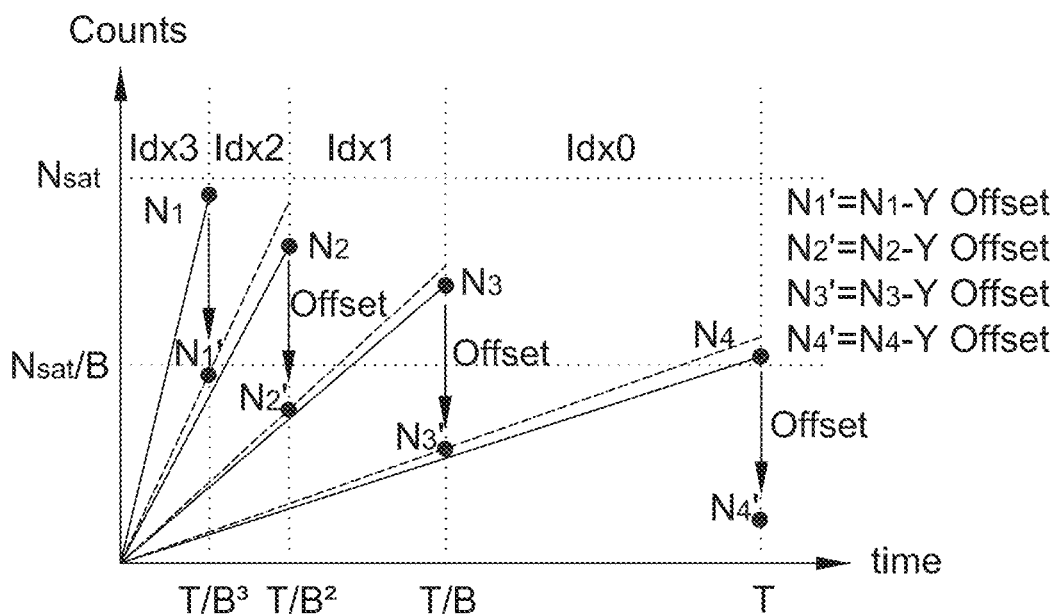
FIG. 9 is a schematic diagram of subtracting a count offset from photon counts at every temporal checkpoint within an exposure time of a sub-frame in operating the optical sensor according to one embodiment of the present disclosure.

For example, FIG. 9 shows that a Y Offset is subtracted from the photon counts N1, N2, N3 and N4 to respectively form N1', N2', N3' and N4'. It is seen from FIGS. 4 and 9 that a photon count N1 within the third index region Idx3 in FIG. 4 is changed to a photon count N1' which is within the second index region Idx2 (comparing with two thresholds Nsat and Nsat/B) in FIG. 9. The relationship between index states and light intensity (cps) is shown in FIG. 7 after a Y offset is incorporated to the photon counts N1, N2, N3 and N4. It is also seen from FIGS. 5 and 7 that an SPAD pixel receiving light intensity (e.g., shown by an arrow symbol) in the third index region Idx3 in FIG. 5 is changed to be within the second index region Idx2 in FIG. 7 by incorporating a count offset. In this way, it is able to detect the index change under strong light intensity.

It is appreciated that the Y offset (i.e. count offset) may be added to the photon counts N1, N2, N3 and N4 under weak light intensity. That is, a value of the Y offset is not particularly limited and is determined according to different applications to improve a resolution of the index change.

FIG. 10 is a schematic diagram of a relationship between eight index regions (or states) and light intensity. Since the present disclosure is to determine whether an SPAD pixel detects an illumination change, the detection resolution is improved by increasing a number of indexes (i.e. a number of temporal checkpoints). However, in an environment having serious noises, using more checkpoints can also induce instability because it is easier to generate an index change caused by noises rather than by signals of interest. Accordingly, in the example that more checkpoints are used, a threshold (i.e. index step) to determine whether an index change occurs is selected at least two steps, i.e. an index state changing larger than or equal to 2 or 3 index regions being considered an index change occurred. That is, in the present disclosure, an index changing step is selected to be larger than or equal to one index region according to an operation environment of the optical sensor 100.

Please refer to FIG. 11, it is an operating method of determining an illumination change detected by one SPAD pixel of an event-based vision sensor 100, including the steps of: counting, by a corresponding counter, a number of photons received by said one SPAD pixel respectively within adjacent exposure times, e.g., including a first exposure time and a second exposure time (Step S1101); determining, by a processor, a first index state of said one SPAD pixel according to a first photon counts counted by the corresponding counter within the first exposure time (Step S1102); determining, by the processor, a second index state of said one SPAD pixel according to a second photon counts counted by the corresponding counter within the second exposure time (Step S1103); and calculating, by the processor, an index change between the first index state and the second index state to indicate the illumination change detected by said one SPAD pixel (Step S1104).

Please refer to FIG. 3 again, in the Step S1101, the counter 13 corresponding to an SPAD pixel 112 counts a photon count C02 in the sub-frame SF1 and a photon count C12 in the sub-frame SF2. The first exposure time and the second exposure time are respectively used to generate the sub-frame SF1 and the sub-frame SF2.

Step S1102: The processor 16 determines a first index state of the SPAD pixel 112 by comparing the photon count C02 at different checkpoints (e.g., including N1, N2 and N3) with two thresholds Nsat and Nsat/B as shown in FIG. 4. FIG. 3 shows that the first index state of the SPAD pixel 112 in the sub-frame SF1 is Idx1. The method of determining the first index state of SPAD pixels 111 to 114 was described above and thus details thereof are not repeated herein.

S1103: The processor 16 then determines a second index state of the SPAD pixel 112 by comparing the photon count C12 at different checkpoints (e.g., including N1, N2 and N3) with two thresholds Nsat and Nsat/B as shown in FIG. 4. FIG. 3 shows that the second index state of the SPAD pixel 112 in the sub-frame SF2 is Idx2. The method of determining the second index state of SPAD pixels 111 to 114 was described above and thus details thereof are not repeated herein.

S1104: The processor 16 then calculates an index change (shown as +1 in FIG. 3) to indicate the illumination change detected by the SPAD pixel 112. The index changes of other SPAD pixels are obtained by similar process. In the present disclosure, +1 index change indicates the detected light illumination is increasing, and −1 index change indicates the detected light illumination is decreasing, or vice versa. The control corresponding to the EVS output is determined according to different requirements.

It should be mentioned that the state regions numerated as 0 to 7 herein are only intended to indicate different index states but not to limit the present disclosure.

It should be mentioned that the values mentioned in the above embodiments, e.g., including the index states, index changes, counting values, Y offset, frame periods, sub-frame periods, number of pixels, number of sub-frames and base values are only intended to illustrate but not to limit the present disclosure.

As mentioned above, in the conventional PPD-based EVS sensor, EVS pixels are not embedded in each and every pixel of a CMOS pixel array due to the large area for a post-processing circuit of the EVS pixels. Accordingly, the present disclosure further provides an event-based vision sensor that adopts an SPAD in each pixel of an SPAD pixel array (e.g., as shown in FIG. 1) since the SPAD has the advantages of high sensitivity, low noises, fast response and full digitization. The same pixel is used to output pixel data of an image frame and multiple EVS frames prior to the image frame using counting values associated with the same pixel. Furthermore, the multiple EVS frames can further be used to calibrate the image frame to realize a high dynamic range even operated in a strong ambient light environment.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. An event-based vision sensor (EVS), comprising:
a pixel array, comprising a plurality of single photon avalanche diode (SPAD) pixels arranged in a matrix;
a plurality of counters, coupled to the pixel array, and configured to count a number of photons received by the plurality of SPAD pixels; and
a processor, coupled to the plurality of counters, and configured to
determine an index state of each SPAD pixel corresponding to each sub-frame according to the number of photons received by the plurality of SPAD pixels within a sub-frame period, and
calculate an index change of said each SPAD pixel between two adjacent sub-frames.

2. The event-based vision sensor as claimed in claim 1, wherein the processor is further configured to
generate an image frame every predetermined number of sub-frames, and
calculate a summation of the number of photons of corresponding SPAD pixels of the predetermined number of sub-frames as photon counts of every pixel of the image frame.

3. The event-based vision sensor as claimed in claim 1, wherein the processor is configured to determine the index state of one SPAD pixel in a sub-frame by
comparing a number of photons associated with said one SPAD pixel respectively read at a predetermined number of temporal checkpoints within the sub-frame period with two thresholds, and
determining the index state according to a temporal checkpoint at which the number of photons associated with said one SPAD is between the two thresholds.

4. The event-based vision sensor as claimed in claim 3, wherein
one of the two thresholds is a saturation count of the counters, and
the other one of the two thresholds is the saturation count divided by an exponent between the predetermined number of temporal checkpoints.

5. The event-based vision sensor as claimed in claim 3, wherein the predetermined number of temporal checkpoints has an exponential relationship.

6. The event-based vision sensor as claimed in claim 1, wherein the index change is indicated by +1 or −1.

7. The event-based vision sensor as claimed in claim 6, wherein the processor is further configured to
indicate the index change of one SPAD pixel by 1 upon the index state of said one SPAD pixel increasing to be larger than or equal to a changing step,
indicate the index change of one SPAD pixel by −1 upon the index state of said one SPAD pixel decreasing to be smaller than or equal to the changing step, and
indicate no index change of one SPAD pixel by 0 upon the index state of said one SPAD pixel not increasing to be larger than or equal to the changing step nor decreasing to be smaller than or equal the changing step.

8. The event-based vision sensor as claimed in claim 1, wherein the processor is further configured to adjust an exposure time of the sub-frame when a number of SPAD pixels having the index change is not within a predetermined percentage range of a total number of the plurality of SPAD pixels.

9. The event-based vision sensor as claimed in claim 1, wherein the processor is further configured to adjust a count offset to the number of photons when a number of SPAD pixels having the index change is not within a predetermined percentage range of a total number of the plurality of SPAD pixels.

10. An operating method of determining an illumination change detected by one SPAD pixel of the event-based vision sensor as claimed in claim 1, the operating method comprising:
counting, by a corresponding counter, a number of photons received by said one SPAD pixel respectively within adjacent exposure times, including a first exposure time and a second exposure time;
determining, by the processor, a first index state of said one SPAD pixel according to a first photon counts counted by the corresponding counter within the first exposure time;
determining, by the processor, a second index state of said one SPAD pixel according to a second photon counts counted by the corresponding counter within the second exposure time; and
calculating, by the processor, an index change between the first index state and the second index state to indicate the illumination change detected by one SPAD pixel.

11. The operating method as claimed in claim 10, wherein in determining the first index state and the second index state, the operating method comprises:
- comparing, by the processor, a first number of photons at a first checkpoint with two thresholds to determine whether said one SPAD pixel is in a third index region;
- comparing, by the processor, a second number of photons at a second checkpoint, behind the first checkpoint, with the two thresholds to determine whether said one SPAD pixel is in a second index region upon said one SPAD pixel not in the third index region;
- comparing, by the processor, a third number of photons at a third checkpoint, behind the second checkpoint, with the two thresholds to determine whether said one SPAD pixel is in a first index region upon said one SPAD pixel not in the second index region; and
- determining that said one SPAD pixel is in a zero index region upon said one SPAD pixel not in the first index region.

12. The operating method as claimed in claim 11, wherein one of the two thresholds is a saturation count of the counters, and
the other one of the two thresholds is the saturation count divided by an exponent between the first, second and third checkpoints.

13. The operating method as claimed in claim 11, wherein
the third checkpoint is at a time point obtained by dividing the exposure time by a predetermined exponent,
the second checkpoint is at a time point obtained by dividing the third checkpoint by the predetermined exponent, and
the first checkpoint is at a time point obtained by dividing the second checkpoint by the predetermined exponent.

14. The operating method as claimed in claim 11, further comprising:
- shortening an exposure time of said one SPAD pixel upon index states of said one SPAD pixel being continuously in the third index region for a predetermined number of sub-frames to improve a resolution of the index change.

15. The operating method as claimed in claim 11, further comprising:
- adding a count offset to the number of photons received by said one SPAD pixel upon index states of the SPAD pixel being continuously in the third index region for a predetermined number of sub-frames to improve a resolution of the index change.

16. The operating method as claimed in claim 10, wherein the index change is indicated by +1 or −1.

17. The operating method as claimed in claim 16, further comprising:
- indicating the index change by 1 upon the second index state being larger than or equal to the first index state by a changing step,
- indicating the index change by −1 upon the second index state being smaller than or equal to the first index state by the changing step, and
- indicating no index change by 0 upon the second index state not being larger than or equal to the changing step nor smaller than or equal to the changing step.

18. The operating method as claimed in claim 10, further comprising:
- counting a number of photons received by said one SPAD pixel within a plurality of exposure times; and
- calculating a summation of the number of photons counted within the plurality of exposure times as a photon count of a corresponding pixel of an image frame.

19. An optical sensor, comprising:
- a pixel array, comprising a plurality of single photon avalanche diode (SPAD) pixels arranged in a matrix;
- a plurality of counters, coupled to the pixel array, and configured to count a number of photons received by the plurality of SPAD pixels; and
- a processor, coupled to the plurality of counters, and configured to
  - calculate an index change of every SPAD pixel to indicate an illumination change detected by said every SPAD pixel within a sub-frame period, and
  - generate an image frame according to the number of photons of the plurality of SPAD pixels counted within a frame period, larger than the sub-frame period.

20. The optical sensor as claimed in claim 19, wherein pixel data of each pixel of the image frame is a summation of the number of photons received by a corresponding SPAD pixel within a plurality of sub-frame periods.

* * * * *